United States Patent Office 3,536,677
Patented Oct. 27, 1970

1

3,536,677
POLYTHIAALKYL ACRYLATES AND ACRYL-AMIDES AND COPOLYMERS CONTAINING SAME
Kenneth R. Hollister, Rochester, N.Y., assignor to Eastman Kodak Company, Rochester, N.Y., a corporation of New Jersey
No Drawing. Filed Jan. 29, 1968, Ser. No. 701,114
Int. Cl. C08f 13/00; C07c 143/12, 103/38
U.S. Cl. 260—79.3
18 Claims

ABSTRACT OF THE DISCLOSURE

Acrylic acid esters and amides, prepared by condensation of a polythiaalkanol or polythiaalkylamine with acrylyl chloride, are useful monomers for making ethylenic copolymers useful as photographic silver halide emulsion peptizers. Monomers and copolymers of monomers in which the alkyl ester or alkylamine moiety contains two thia sulfur atoms are disclosed.

---

This invention relates to new compositions of matter, particularly to new acrylate and acrylamide compounds useful in making polymers thereof useful in photography and to such polymer compositions.

In preparation of silver halide photographic emulsions, it has been conventional practice to precipitate silver halide grains, by reaction of a soluble silver salt, e.g., silver nitrate, and a soluble halide, e.g., potassium bromide, in aqueous medium containing gelatin as a peptizing agent. Action of the peptizing agent in regulating grain dispersion and grain growth during the silver halide precipitation and emulsification step is critical in determining the ultimate photographic properties of the emulsion. Recently the excellent peptizing effects of a class of sulfide-containing synthetic vinyl copolymers has been discovered. Generally, the useful class of copolymers can be described as water-soluble linear addition copolymers of ethylenic monomers comprising units polymerized from monomers selected from amides and esters of acrylic, methacrylic and maleic acids, in which the respective amine and alcohol condensation residues of such selected amides and esters comprise within their structure an organic group having at least one sulfide sulfur atom linking two alkyl carbon atoms. That discovery is described in more detail in the copending U.S. application Ser. No. 701,084 filed by Ernest J. Perry et al. of even date with the present application.

An object of the present invention is to provide new and useful compositions of matter. More particularly, one object is to provide new chemical compounds useful as monomers for making ethylenic addition copolymers which are useful as peptizers for making photographic emulsions. Another object is to provide useful copolymers which contain units of such new compounds in the polymer chain.

According to the invention, I provide acrylic acid esters and amides having the formula

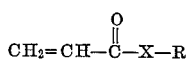

wherein X is selected from —O— and —NH— and R

2 is polythiaalkyl containing two sulfide sulfur atoms separated by at least one carbon atom. These esters and amides are useful building blocks, as monomers for making addition copolymers of ethylenic monomers which comprise such amides and esters as addition polymerized units in the polymer chain. A specific utility for such copolymers is their use as photographic silver halide emulsion peptizers, as mentioned herein and as described in the above-mentioned copending application which is incorporated herein by reference.

A convenient process for making the new acrylic acid esters and amides is by condensation of a polythiaalkanol or a polythiaalkylamine with acrylyl chloride. The reaction can be carried out using approximately equimolar quantities of the polythiaalkanol, acrylyl chloride, and triethylamine in organic solvent, as illustrated in more detail by the specific examples detailed below. This is only a preferred method of making the new vinyl monomers and the invention is contemplated broadly as including all embodiments of the defined class of acrylic acid esters and amides by whatever method they are made.

Following are detailed examples describing preferred embodiments of the invention and including my most preferred mode of carrying out the invention.

EXAMPLE 1

N-[2,2-bis(1-thiapropyl)ethyl]acrylamide

Aminoacetaldehyde diethylmercaptal is prepared in a manner similar to the general method described by R. A. Baxter, G. T. Newbold, and F. S. Spring, J. Chem. Soc., 1947, 370. A solution of 39.9 grams (0.30 mole) of aminoacetaldehyde diethyl acetal in 25 milliliters of water is cooled to 0-5° C. and stirred rapidly as 200 milliliters of concentrated hydrochloric acid is added dropwise, followed by the dropwise addition of 62.1 grams (1.0 mole) of ethanethiol. After stirring at room temperature overnight, the reaction mixture is poured slowly into a mixture of 500 milliliters of 40 percent sodium hydroxide and 1200 grams of ice. The product is then extracted into chloroform, dried over magnesium sulfate, and the volatiles removed on a rotary evaporator. Vacuum distillation of the residual oil yields 40.7 grams (0.25 mole; 82 percent yield) of product (B.P. 56–7° C./2.5 mm.).

A solution of 132.0 grams (0.80 mole) of aminoacetaldehyde diethylmercaptal and 81.5 grams (0.80 mole) of triethylamine in 600 milliliters of ether is stirred continuously in a dry system being cooled with an ice bath as 72.4 grams (0.80 mole) of acrylyl chloride in 100 milliliters of ether is added over a period of 20 minutes. The system is stirred an additional 30 minutes, filtered, and the volatiles removed from the filtrate on a rotary evaporator. A total of 158.3 grams (0.73 mole; 91 percent yield) of a white crystalline product remains, which, upon recrystallization from a 1:1 (vol.) ethanol-water solution, has a M.P. of 51–2° C.

*Analysis.*—Calcd. for $C_9H_{17}NOS_2$ (percent): C, 49.2; H, 7.8; N, 6.4; S, 29.2. Found (percent): C, 49.0; H, 7.8; N, 6.1; S, 29.6.

EXAMPLE 2

N-(3,6-dithiaheptyl)acrylamide

A precursor, 3-thiabutyl mercaptan, is prepared in the following manner:

A mixture of 276.0 grams (3.0 moles) of 2-(methylthio)ethanol, 258.8 grams (3.4 moles) of thiourea, and 300 milliliters (3.6 moles) of concentrated hydrochloric acid is refluxed for 20 minutes. It is then steam distilled until about 500 milliliters of distillate is removed, treated with 148 grams (3.7 moles) of sodium hydroxide in 450 milliliters of water, and then quickly acidified with concentrated hydrochloric acid. After cooling, the top layer is removed in a separatory funnel and distilled. A yield of 280.3 grams (2.6 moles; 86.5 percent yield) of a colorless liquid (B.P. 54–6° C./12 mm.) is obtained.

The 3-thiabutyl mercaptan is then converted into 3,6-dithiaheptylamine in the following manner:

A solution of 280.1 grams (2.6 moles) of 3-thiabutyl mercaptan and 5 grams of sodium methoxide in 600 milliliters of ethanol is heated to 50±3° C. with stirring in a dry system as 120.4 grams (2.8 moles) of ethylenimine is added over a period of one-half hour. The system is kept at 50° C. for two more hours and then letf at room temperature overnight. After removing the volatiles on a rotary evaporator the residual oil is vacuum distilled yielding 333.1 grams (2.2 moles; 85 percent yield) of a clear, colorless liquid (B.P. 100–7° C./1.0 mm.).

The 3,6-dithiaheptylamine is converted into the desired monomer in the following manner:

A solution of 332.2 grams (2.20 moles) of 3,6-dithiaheptylamine and 222.6 grams (2.20 moles) of triethylamine in three liters of benzene is stirred in a dry system under nitrogen and cooled to 0–10° C. with an ice bath as 199.2 grams (2.20 moles) of acrylyl chloride is added over a period of 45 minutes. The cold bath is then removed and the system allowed to come to room temperature with stirring over two hours. After filtering of the solid precipitate and adding benzene washes of it to the filtrate, the benzene is removed from the filtrate on a rotary evaporator. A total of 368.1 grams (82 percent yield) of a pale yellow solid is obtained. Recrystallization of the product from 1,4-dichlorobutane followed by an ether wash and vacuum drying yields 250.2 grams (1.22 moles; 55.5 percent yield) of a white crystalline solid (M.P. 58–610 C.).

Analysis.—Calcd. for $C_7H_{15}NS_2$ (percent): C, 46.8; H, 7.4; N, 6.8; S, 31.2. Found (percent): C, 46.4; H, 7.8; N, 6.6; S, 30.8.

EXAMPLE 3

N-(3,6-dithiaoctyl)acrylamide

This compound is prepared in essentially the same manner as N-(3,6-dithiaheptyl)acrylamide in Example 2 except that the starting mercaptan in this case is 2-(ethylthio)ethanol. The product is a white crystalline solid (M.P. 49–52° C.).

Analysis.—Calcd. for $C_9H_{17}NOS_2$ (percent): C, 49.2; H, 7.8; N, 6.4; S, 29.2. Found (percent): C, 49.5; H, 8.0; N, 6.2; S, 29.0.

EXAMPLE 4

Bis(2-thiabutyl)methyl acrylate

The precursor, bis(2-thiabutyl)carbinol, is prepared in one step, combining the steps in the two-step synthesis used by T. K. Todson, C. B. Pollard, and E. G. Rietz, J. Am. Chem. Soc., 72, 4000 (1950).

A clear solution of 702 grams (1.30 moles) of sodium methoxide in 400 milliliters of methanol is cooled with an ice-acetone bath with continuous stirring under a nitrogen atmosphere as 77.66 grams (1.20 moles) of ethanethiol is slowly added. Following this 46.67 grams (0.50 mole) of epichlorohydrin is added over a period of 15 minutes (maximum temperature 20° C.). After stirring in the cold an additional 15 minutes, the system is refluxed on a steam bath for three hours, and then cooled again as 120 milliliters (1.44 moles) of concentrated hydrochloric acid is added over a period of 10 minutes. The mixture is stirred at room temperature for one hour, filtered and the filtrate treated with 250 milliliters of water and 1 liter of ether. The ether layer is separated and washed with another 250 milliliters of water. After combining it with ether washes of combined water layers, the ether extract is dried with magnesium sulfate and volatiles removed on a rotary evaporator. Vacuum distillation of the residue yields 68.6 grams (0.38 mole; 76 percent yield) of a clear, colorless liquid (B.P. 108–116° C./1.0 mm.).

The bis(2-thiabutyl)carbinol is converted into the desired monomer in the following manner:

A solution of 63.0 grams (0.35 mole) of bis(2-thiabutyl-carbinol and 35.4 grams (0.35 mole) of triethylamine in 400 milliliters of ether is cooled in an ice bath and stirred as 31.7 grams (0.35 mole) of acrylol chloride is added over 25 minutes. The cold bath is then removed and the system stirred an additional two hours, following which the mixture is filtered. The volatiles are removed from the filtrate, following which it is vacuum distilled to give 60.7 grams (0.26 mole, 74 percent yield) of a clear, colorless liquid (B.P. 114–6° C./0.8 mm.).

Analysis.—Calcd for $C_{10}H_{18}O_2S_2$ (percent): C, 51.2; H, 7.7; S, 27.4. Found (percent): C, 51.4; H, 8.0; S. 27.7.

EXAMPLE 5

Poly{N - [2,2 - bis(1 - thiapropyl)ethyl]acrylamide - co-3-acryloyloxypropane - 1 - sulfonic acid, sodium salt} (molar ratio 1:12)

A solution of 10.95 grams (0.050 mole) of N-[2,2-bis(1-thiapropyl)ethyl]acrylamide, 129.6 grams (0.60 mole) of 3-acryloyloxypropane-1-sulfonic acid, sodium salt, and 0.70 gram of 2,2′-azobis(2-methylpropionitrile) in 422 milliliters of redistilled dimethyl sulfoxide is swept with nitrogen for 15 minutes and placed in a 60° C. bath overnight. The polymer is precipitated and thorough washed in a large excess of acetone, following which it is dried under vacuum at room temperature. The product is a brittle, white solid which comprises 132.2 grams (94 percent yield).

EXAMPLE 6

Poly[N - (3,6 - dithiaheptyl)acrylamide - co - 3-acryloyloxypropane - 1 - sulfonic acid, sodium salt] (molar ratio 1:12)

A solution of 8.20 grams (0.040 mole) of N-(3,6-dithiaheptyl)acrylamide, 103.48 grams (0.480 mole) of 3-acryloyloxypropane-1-sulfonic acid, sodium salt, and 0.56 gram of 2,2′-azo-bis(2-methylpropionitrile) in 447 milliliters of redistilled dimethyl sulfoxide is swept with nitrogen for 15 minutes and placed in a 60° C. bath overnight. The polymer is precipitated and thoroughly washed in a large excess of acetone, following which it is dried under vacuum at room temperature. The produce is a brittle, white solid which comprises 100.0 grams (90 percent yield).

EXAMPLE 7

Poly[N - (3,6 - dithiaoctyl)acrylamide-co-3-acryloyloxypropane-1-sulfonic acid, sodium salt] (molar ratio 1:15)

A solution of 21.9 grams (0.10 mole) of N-(3,6-dithiaoctyl)acrylamide, 324.0 grams of 3-acryloyloxypropane-1-sulfonic acid, sodium salt, and 1.73 grams of 2,2′azobis(2-methylpropionitrile) in 1384 milliliters of redistilled dimethyl sulfoxide is swept with nitrogen for 15 minutes and placed in a 60° C. bath overnight. The polymer is precipitated and thoroughly washed in a large excess of acetone, following which it is dried under vacuum at room temperature. The product is a brittle, white solid which comprises 323.4 grams (93 percent yield).

EXAMPLE 8

Poly[N - (3,6 - dithiaoctyl)acrylamide-co-3-acryloyloxypropane-1-sulfonic acid, sodium salt] (molar ratio 1:21)

This copolymer is prepared in essentially the same manner as that in Example 7, except that here the molar ratio of monomers is 1:21 rather than 1:15.

EXAMPLE 9

Poly[bis(2-thiabutyl)methyl acrylate-co-acryloxypropane-1-sulfonic acid, sodium salt] (molor ratio 1:12)

A solution of 11.70 grams (0.050 mole) of bis(2-thiabutyl)methyl acrylate, 129.6 grams (0.60 mole) of 3-acryloyloxy-propane-1-sulfonic acid, sodium salt, and 0.71 gram of 2,2'-azobis(2-methylpropionitrile) in 565 milliliters of redistilled dimethyl sulfoxide is swept with nitrogen for 15 minutes and placed in a 60° C. bath overnight. The polymer is precipitated and thoroughly washed in a large excess of acetone, following which it is dried under vacuum at room temperature. The product is a brittle, white solid which comprises 134.2 grams (95 percent yield).

EXAMPLE 10

A high-speed silver bromoiodide (94:6) negative emulsion is prepared of the kind described by Trivelli and Smith [Phot. J. 79, 330 (1939)] except that the peptizer used is poly[N - (3,6 - dithiaoctyl)acrylamide - co - 3-acryloyloxypropane - 1 - sulfonic acid, sodium salt] (molar ratio 1:15), prepared as described in Example 7. The emulsion obtained is completely free from clumps and consists of octahedral silver halide crystals ranging in size from 0.35–2.0 microns (diameter). The soluble salts are then removed from the emulsion in a manner well known to those skilled in the art, and the emulsion grains are subsequently dispersed in gelatin. The emulsion is then digested to optimum speed and, after addition of conventional adjuvants, is coated on a cellulose acetate film support at a coverage of 540 milligrams of silver and 1000 milligrams of gelatin per square foot. A sample of the film coating is exposed on an Eastman 1B sensitometer, processed for five minutes in Kodak DK–50 Developer, fixed, washed and dried. The following sensitometric values are then obtained: Relative speed=98 (relative speed of a similarly prepared, gelatin-peptized emulsion=100); γ=0.72; Fog=0.12.

The foregoing examples illustrate in detail several preferred embodiments of the invention including my most preferred mode of carrying out the invention. Other variations can be made within the scope of the invention.

The examples illustrate acrylates and acrylamides of the formula

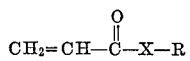

as defined above, in which R is thiaalkyl containing two sulfur atoms and containing five to seven carbon atoms. The invention further includes compounds of the general formula in which R can be another thiaalkyl group preferably containing 3 to 12 carbon atoms with two sulfide sulfur atoms, which can be made, for example, by using corresponding homologues of the reactants in the method described in the examples.

In the examples, I have described copolymers made with the ethylenic comonomer 3 - acryloyloxypropane - 1-sulfonic acid, sodium salt, which is a preferred comonomer because it lends excellent solubility characteristics to the polymer, but other soluble copolymers useful as peptizers for photographic silver halide emulsions can be made using other ethylenic comonomers with the acrylates and acrylamides of the formula above. Some specific examples of such other ethylenic comonomers include acrylic and methacrylic acids and esters of such acids not containing the sulfide sulfur atom, ethylene and other α,β-unsaturated hydrocarbons, other vinyl esters containing the sulfate and sulfonate groups, and the like.

In the examples the molar ratios of the sulfide-containing monomers to the other comonomers in the copolymer range from 1/12 to 1/21. In other embodiments, the molar concentration of the sulfide-containing acrylates and acrylamides can range from about three mole percent up to about 50 mole percent, based on the entire polymerized monomer composition of the copolymer. The monomers containing two sulfide sulfur atoms generally are found to be effective at lower molar concentrations in copolymers used for the emulsion peptizing effect than are other monomers containing a single sulfide atom of the kinds described in the copending U.S. application Ser. No. 701,084 mentioned above.

Although the invention has been described in detail with particular reference to certain preferred embodiments thereof, variations and modifications can be effected within the spirit and scope of the invention as described hereinbefore and as defined in the appended claims.

I claim:

1. A chemical compound having the formula:

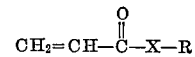

wherein X is a —NH— group and R is a polythiaalkyl group containing 2 sulfide sulfur atoms which are separated by at least 1 carbon atom.

2. A compound according to claim 1 wherein R is a dithiaalkyl group.

3. A compound according to claim 1 wherein R comprises 3 to 10 carbon atoms.

4. A compound according to claim 1 wherein R comprises from 5 to 7 carbon atoms.

5. N-[2,2-bis(1-thiapropyl)ethyl]acrylamide.

6. N-(3,6-dithiaheptyl)acrylamide.

7. N-(3,6-dithiaoctyl)acrylamide.

8. A water-soluble linear addition copolymer comprising (1) from about 3 to about 50 mole percent of units of a monomer having the formula:

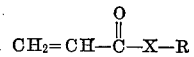

wherein X is a —NH— group and R is a polythiaalkyl group containing 2 sulfide atoms which are separated by at least 1 carbon atom and (2) units of at least 1 other ethylenically unsaturated monomer.

9. A water-soluble copolymer according to claim 8 wherein said other ethylenically unsaturated monomer consists essentially of 3 - acryloyloxypropane - 1 - sulfonic acid, sodium salt.

10. A copolymer defined by claim 8 wherein said monomer of the defined formula consists essentially of N-[2,2-bis(1-thiapropyl)ethyl acrylamide].

11. A copolymer defined by claim 8 wherein said monomer of the defined formula consists essentially of N-(3,6-dithiaheptyl)acrylamide.

12. A copolymer defined by claim 8 wherein said monomer of the defined formula consists essentially of N-(3,6-dithiaoctyl)-acrylamide.

13. A copolymer defined by claim 10 wherein said units polymerized from N - [2,2 - bis( 1 - thiapropyl)ethyl acrylamide] constitute about 1 molar part for every 12 molar parts of units polymerized from 3 - acryloyloxypropane - 1 - sulfonic acid, sodium salt, in the copolymer.

14. A copolymer defined in claim 11 wherein said units polymerized from N - (3,6 - dithiaheptyl)acrylamide constitute about 1 molar part for every 12 molar parts of units polymerized from 3 - acryloyloxypropane - 1 - sulfonic acid, sodium salt, in the copolymer.

15. A copolymer defined by claim 12 wherein said units polymerized from N - (3,6 - dithiaoctyl)acrylamide constitute 1 molar part for every 15 molar parts of units polymerized from 3 - acryloyloxypropane - 1 - sulfonic acid, sodium salt, in the copolymer.

16. Copoly[N - (3,6 - dithiaheptyl)acrylamide - 3-acryloyloxypropane-1-sulfonic acid, sodium salt].

17. Copoly[N - (3,6 - dithiaoctyl)acrylamide - 3-acryloyloxypropane-1-sulfonic acid, sodium salt].

18. A copolymer according to claim 8 wherein the mole ratio of units of monomer defined by said formula range from 1/12 to 1/21 of the other units of monomers in said copolymer.

References Cited

UNITED STATES PATENTS

| | | | |
|---|---|---|---|
| 3,046,133 | 7/1962 | Minsk | 96—108 |
| 3,214,370 | 10/1965 | Bailey | 210—54 |
| 3,411,911 | 11/1968 | Dykstra | 96—87 |

JOSEPH L. SCHOFER, Primary Examiner

C. A. HENDERSON, JR., Assistant Examiner

U.S. Cl. X.R.

260—79.7, 481, 486, 561; 117—144; 94—114

PO-1050
(5/69)

UNITED STATES PATENT OFFICE
CERTIFICATE OF CORRECTION

Patent No. 3,536,677          Dated October 27, 1970

Inventor(s) Kenneth R. Hollister

It is certified that error appears in the above-identified patent and that said Letters Patent are hereby corrected as shown below:

Column 3, line 14, "ethanol" should read ---methanol---; line 17, "letf" should read ---left---; line 39, "58-61o" should read --- 58-61° ---; line 40, "C7H15NS2" should read --- C8H15NS2 ---; line 62, "702" should read ---70.2---; line 65, "1.20" should read ---1.25---; line 66, "46.67" should read ---46.27---. Column 4, lines 8-9, "deesired" should read ---desired---; lines 10-11, "bis(2-thiabutyl-carbinol" should read --- bis(2-thiabutyl)carbinol ---; line 13, "acrylol" should read ---acryloyl---; line 34, "thorough" should read ---thoroughly---; line 47, "wept" should read ---swept---; line 51, "produce" should read ---product---; line 60, "2,2'azobis" should read --- 2,2'-azobis ---. Column 5, lines 2-3, "-co-acryloxypropane-" should read --- co-3-acryloyloxypropane- ---. Column 6, line 71, "in" should read ---by---. Column 7, line 4, "-3-" should read --- --3- ---; line 6, "-3-" should read --- --3- ---.

SIGNED AND
SEALED
JAN 5 1971

(SEAL)
Attest:

Edward M. Fletcher, Jr.
Attesting Officer

WILLIAM E. SCHUYLER, JR.
Commissioner of Patents